United States Patent [19]

Wei-Chuan

[11] 4,353,590

[45] Oct. 12, 1982

[54] CONTROLLABLE MOTORCYCLE WINDSHIELD

[75] Inventor: Chang Wei-Chuan, Ping-Tung, Taiwan

[73] Assignee: Yang Yin-Lung, Kaohsiung, Taiwan; a part interest

[21] Appl. No.: 790,425

[22] Filed: Apr. 25, 1977

Related U.S. Application Data

[63] Continuation of Ser. No. 626,552, Nov. 26, 1976, abandoned.

[51] Int. Cl.³ .............................................. B62J 17/04
[52] U.S. Cl. .................................................. 296/78.1
[58] Field of Search ................. 296/78.1, 89; 292/228, 292/128, DIG. 6, DIG. 7

[56] References Cited

U.S. PATENT DOCUMENTS

| | | | |
|---|---|---|---|
| 975,414 | 11/1910 | Hadka | 296/89 |
| 1,126,700 | 2/1915 | Bull | 292/128 |
| 1,519,194 | 12/1924 | Ellery | 296/89 |
| 2,411,131 | 11/1946 | Hanson | 296/78.1 |

FOREIGN PATENT DOCUMENTS 497681  9/1954  Italy .................................. 296/78.1

*Primary Examiner*—Robert R. Song

[57] ABSTRACT

A kind of controllable motorcycle windshield made of two pieces of transparent plastic plates or glasses, one of the plates is mounted stationary on the steering hand grip of the motorcycle, the other plate is slidable mounted between two tubular holders which are located at both sides of the stationary plate and can be controlled upward (extended) by a button type actuating mechanism, also it can be pushed down (retracted) overlapping the stationary plate and locked in position when the windshield is not in use.

1 Claim, 7 Drawing Figures

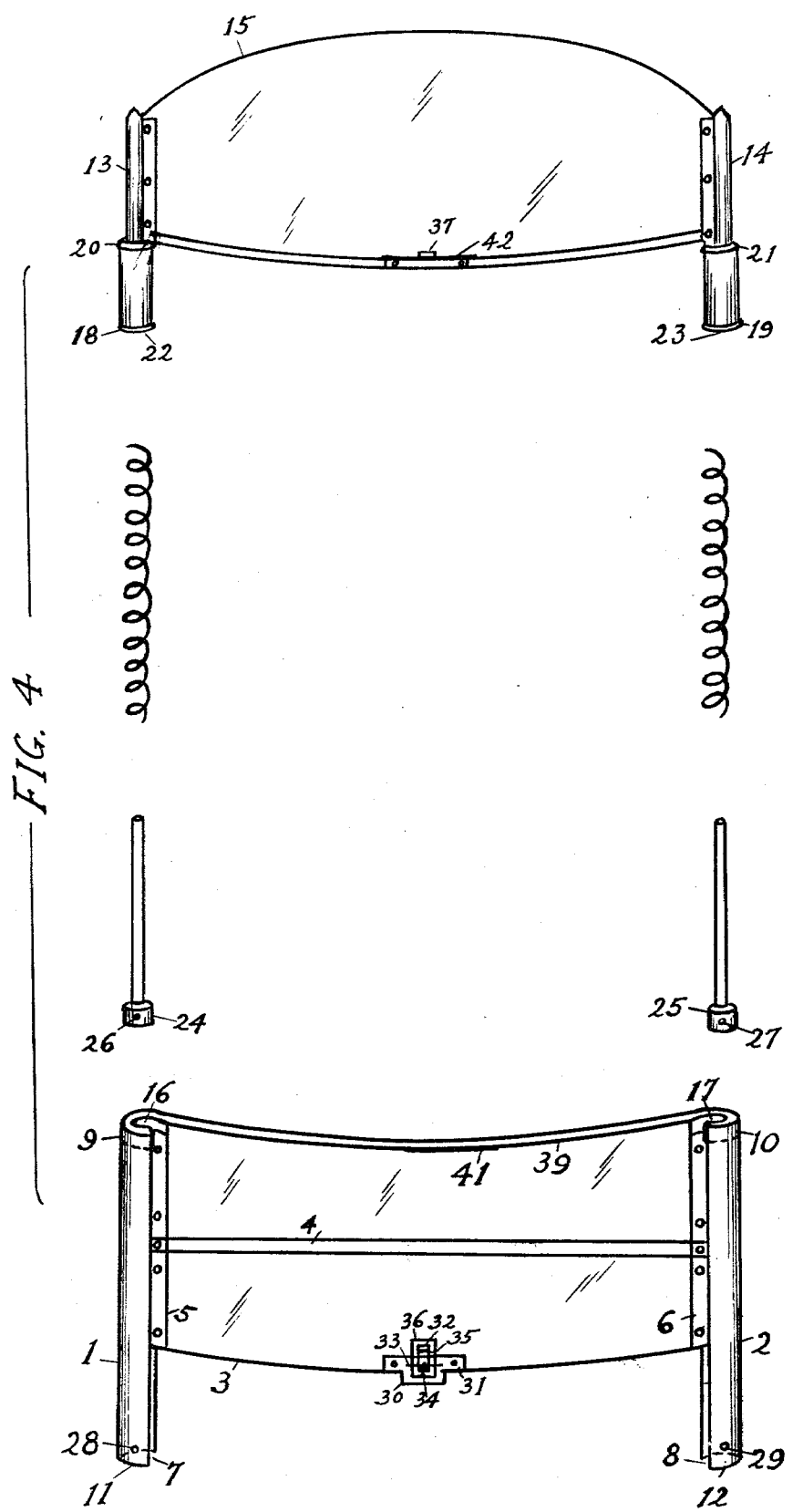

CONTROLLABLE MOTORCYCLE WINDSHIELD

This is a continuation of Ser. No. 626,552, Nov. 26, 1976, now abandoned.

In general, the windshields used on motorcycles today are known as both of fixed or one-piece type and the removable or two-piece type (consisting of an upper plate and a lower plate). The advantage of the latter type over the former type is that the upper plate can be removed for reducing wind friction and for better sight when it is not in use. The disadvantage of the latter type is that the drive must stop the motorcycle to remove or re-install the upper plate of the windshield during driving.

Accordingly, it is the object of this invention to provide a controllable windshield, the driver can control the upper plate of the two-piece type windshield up or down at any time during driving and need not stop the motorcycle.

Another object of this invention is to provide a simple operational means for lifting up or depressing down the upper plate of the said two-pieces type windshield by a finger tip of the operator.

Other objects and advantage will become apparent from the following description taken in connection with the accompanying drawings. In which:

FIG. 4 is a parts break down view of the windshield, showing the elements of the structure.

Figure 1:
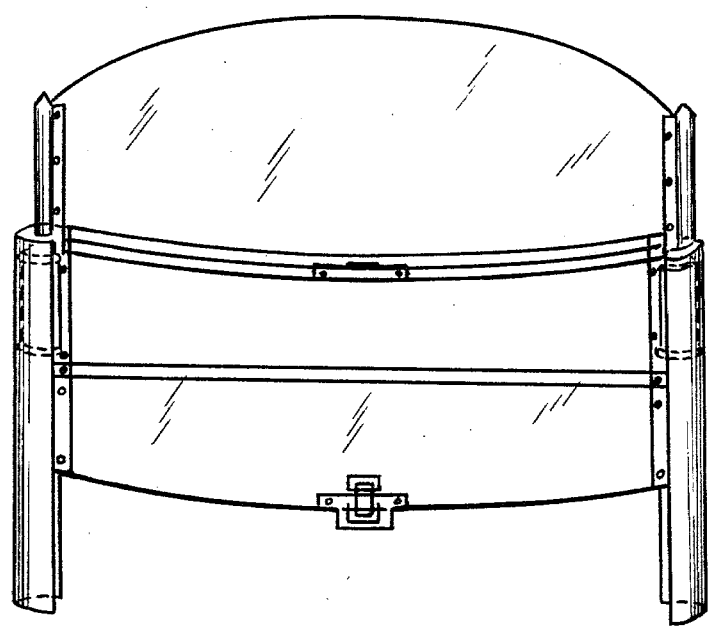
FIG. 1 is an elevation front view of the windshield, showing that the upper plate is in the up or extended position.
Figure 2:
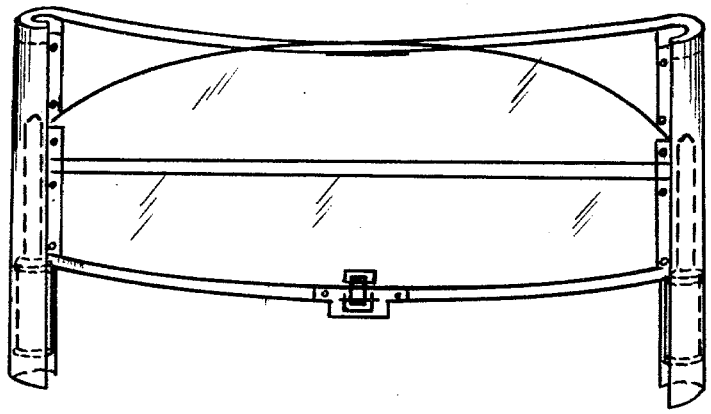
FIG. 2 is an elevation front view of the windshield, showing that the upper plate is in the down or retracted position.
Figure 3:
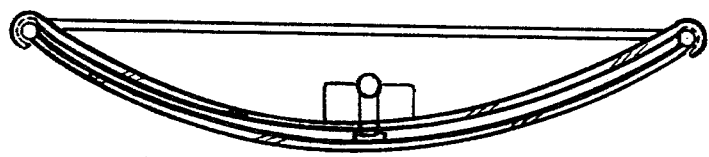
FIG. 3 is a top view of the windshield, showing that the upper plate and the lower plate are overlapping.
Figure 6:
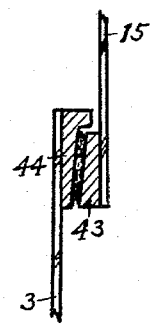
FIG. 6 is a side view of the rubber stops attached to each edge of the plates.
Figure 5:
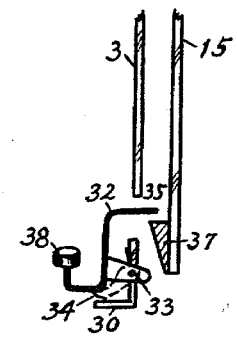
FIG. 5 is a detail side view of the retaining mechanism of the windshield, showing the relationship between the clamp and the catch member of the retaining mechanism.
Figure 7:
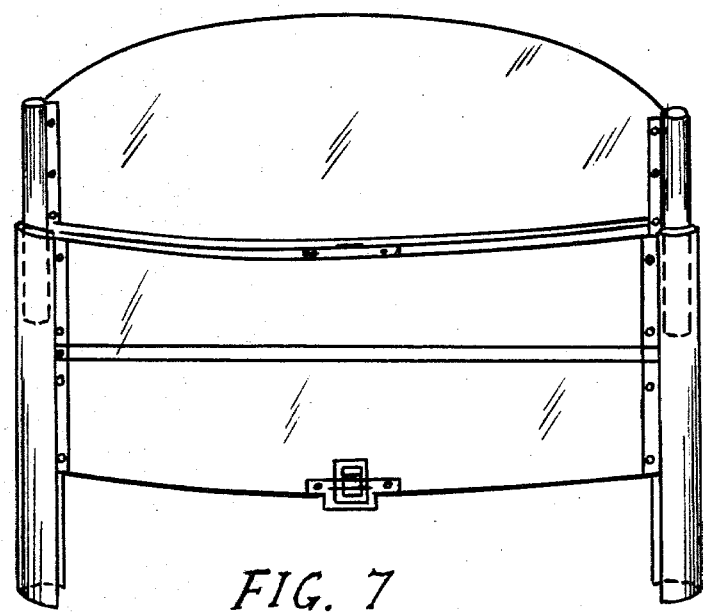
FIG. 7 is a side view of tubular holder and tubular rod of straight type.

As shown in FIG. 4, the windshield of this invention consists of two pieces of plastic plates (or glasses) FIG. 4(A) and FIG. 4(B), two springs FIG. 4(C) and 4(D), two spring spindles FIG. 4(E) and 4(F) and a retaining mechanism FIG. 4(G). The lower plate FIG. 4(A) is slightly curved and clamped tightly between two slots which are formed integrally with two vertical tubular holders 1 and 2 at both sides of the plate 3. A metallic bar 4 which is horizontally mounted is used to connect the tubular holders for strengthening purpose. The tubular holders 1 and 2 together with plastic plate 3 are mounted on the steering hand grip of the motorcycle by a supporting frame (not shown) and are fastened by bolt joints 5 and 6. Each of the tubular holders has a straight cut 7 and 8 respectively at its side wall for holding and allowing free sliding movement of the upper plastic plate when they are assembled. The top end of each tubular holder is flanged toward the center for stopping the upper plastic plate when it is in the raised position which will be later described. The lower end 11 or 12 of each tubular holders is straight. The slidable upper plate FIG. 4(B) is also slightly curved and clamped tightly between two slots which are formed integrally on the tubular rods 13 and 14 at both sides of the plate 15. The tubular rods are smaller in diameter at their upper portion than the lower portion for free movement through the openings 16 and 17 at the top of tubular holders 1 and 2, the tubular rods are sealed for dust proof at the top and are flared as a flange at their bottom 18 and 19. The tubular rods 13 and 14 are installed respectively in the tubular holders 1 and 2 when they are assembled. Both the inner flanges 9 and 10 of the tubular holders and the flared flanges 18 and 19 at the bottom of the tubular rods as well as the shoulders 20 and 21 serve as the guides for the sliding movement of the tubular rods in the tubular holders and less friction will produced. It is obvious that the shoulders 20 and 21 of the tubular rods and the inner flanges 9 and 10 of the tubular holders will act as stops when the upper plate is lifted up. However, the tubular holders as well as the tubular rods may be made straight all thru their tubular body without shoulder or flange for easier manufacturing (see FIG. 7), in this case the upper plate will be stopped by a pair of rubber stops attached to both edges of the plates (see FIG. 6). The springs FIG. 4(C) and 4(D) together with the spring spindles FIG. 4(E) and 4(F) will be installed inside the tubular rods 13 and 14 through the bottom openings 22 and 23 of the tubular rods. The head of the spring spindles 24, 25 will be fastened with the tubular holders by screws or bolts through holes 26, 27, 28 29 respectively. The top of the springs will bear against the inner wall of the shoulders 20 and 21 while the bottom of the springs will bear against the circular face of the heads 24, 25 of the spring spindles, (on the tubular rod of the straight tubular body, the top of springs will bear against the top inward edge of the tubular rods) thus the springs will be compressed whenever the upper plate is pushed down, and the tension of the springs will cause the plate to jump or slide up as soon as the retaining mechanism is released by a button which will be described as follows: A retaining mechanism FIG.(5) consists of a mounting frame 30 which is fixedly riveted at the center of the bottom edge of the lower plate (see 31 in FIG. 4(A)), a clamp 32 which is mounted on the mounting frame 30 with a bolt 33, a spring 34 is mounted on the bolt 33 between the mounting frame 30 and the clamp 32, the tension of the spring 34 urges the tip of the clamp 35 protruding through an aperture 36 of the lower plate. Whenever the upper plate is being pushed down, a catch member 37 which is attached on the center of the bottom edge of the upper plate will slip over the tip of said clamp 35 and be retained because the tension of the spring 34 (see FIG. 5). A button 38 located on the mounting frame 31 is used for depressing the clamp 32 and overcoming the tension of the spring 34 to retract the tip of the clamp 35 from the aperture 36 and release the catch 37, therefore the upper plate will be forced upward by the tension of the springs FIG. 4(C) and 4(D) immediately. A strip of soft rubber is stuck at top edge of the lower plate (39 in FIG. 4(A)) and at the bottom edge of the upper plate (40 in FIG. 4(B)) for air seal between the plates, also for absorbing the bouncing action when the upper plate is going up. A thin hair type polyester sticker may be used on each of the said spongy strips (41 or 42 in FIG. 4(A) and 4(B)) or on the face of the rubber stops (43 and 44 in FIG. 6) for sticking and holding purpose when the upper plate is in the up position. Since the plates are mounted a little declining backward of the motorcycle, the stream of wind force will act on the plates and help to push the upper plate sliding up more quickly when the retaining mechanism is depressed to release by the button, therefore greater force will act on the polyester sticker for holding the upper plate in the up position.

What I claim is:

1. An adjustable windshield for use on vehicles comprising:

a pair of tubular holders each having a longitudinal slot, a first stationary transparent plate having opposed side edges fixedly secured to a respective one of said tubular holders adjacent said slots, a second transparent plate having opposed side edges, means for slidably mounting said second plate on said tubular holders including a tubular rod slidably received within each of said tubular holders, means for limiting the sliding movement of said rods within said holders, a spring spindle fixedly secured to each tubular holder at the lower end thereof and resilient means positioned between each of said spring spindles and each of said tubular rods for raising said tubular rods to a raised position, said side edges of said second transparent plate being secured to a respective one of said tubular rods through said longitudinal slots of said tubular holders, and latching means for releasably securing said second transparent plate with respect to said first transparent plate including a mounting frame fixedly secured at a bottom center back edge of the stationary plate, a spring loaded clamp pivotably mounted on said frame and having a portion thereof extending through an aperture in said first plate, a catch member fixed to a bottom center back edge of said second plate, and means for pivoting said extending portion of said clamp into and out of engagement with said catch member thereby releasably securing said second transparent plate with respect to said first transparent plate, said resilient means urging said second transparent plate to a raised position when said extending portion is out of engagement with said catch member.

* * * * *